United States Patent [19]

Faeser

[11] Patent Number: 4,817,045
[45] Date of Patent: Mar. 28, 1989

[54] MONITORED CONTROL ARRANGEMENT

[75] Inventor: Ulrich Faeser, Kronberg, Fed. Rep. of Germany

[73] Assignee: Fresenius A.G., Bad Homburg, Fed. Rep. of Germany

[21] Appl. No.: 692,270

[22] Filed: Jan. 17, 1985

[30] Foreign Application Priority Data

Jan. 19, 1984 [DE] Fed. Rep. of Germany ....... 3401761

[51] Int. Cl.⁴ .............................................. H02H 5/00
[52] U.S. Cl. .............................. 364/550; 324/158 MG; 361/23
[58] Field of Search ................. 364/550; 340/511, 516, 340/657, 660–662, 515, 663; 324/158 R, 158 MG; 361/23, 96, 97, 236, 242, 90

[56] References Cited

U.S. PATENT DOCUMENTS

| | | | |
|---|---|---|---|
| 3,705,352 | 12/1972 | Restivo | 324/158 MG |
| 3,813,667 | 5/1974 | Smith | 340/662 X |
| 3,942,111 | 3/1976 | Pfouts | 324/158 MG |
| 3,969,635 | 7/1976 | Wilke | 340/662 |
| 4,288,739 | 9/1981 | Nercessian | 324/158 R |
| 4,333,119 | 6/1982 | Schoenmeyer | 340/660 |
| 4,340,935 | 7/1982 | Anlauf et al. | 364/426 |
| 4,366,544 | 12/1982 | Shima et al. | 364/550 |
| 4,403,213 | 9/1983 | Khamore et al. | 340/661 |
| 4,428,020 | 1/1984 | Blanchard | 340/662 |
| 4,438,498 | 3/1984 | Sekel et al. | 324/158 R |
| 4,454,462 | 6/1984 | Spann | 318/729 |
| 4,463,267 | 7/1984 | Bools | 290/40 R |
| 4,473,338 | 9/1984 | Garmong | 318/447 |
| 4,574,266 | 3/1986 | Valentine | 340/516 X |
| 4,574,276 | 3/1986 | Sato | 340/662 |
| 4,590,533 | 5/1986 | Murata | 340/662 |
| 4,597,052 | 6/1986 | Matsuda | 364/550 |

Primary Examiner—Parshotam S. Lall
Assistant Examiner—Edward R. Cosimano
Attorney, Agent, or Firm—Townsend and Townsend

[57] ABSTRACT

In an apparatus whose output power is monitored and controlled to avoid safety-endangering effects, such as medical equipment, a monitored control arrangement is provided which includes (1) a control circuit for controlling output power at a desired level as part of the test wherein the control circuit consists of circuit elements with known failure rates, (2) a monitoring circuit connected to the control circuit to monitor output power and, if output power exceeds a critical level, to disconnect the control circuit to limit the output power (the monitoring circuit should also include circuit elements having known failure behavior) and (3) a test circuit electrically connected to the monitoring circuit and to the control circuit whose function is to disable the control circuit and to control the output power while performing an initial test on the monitoring circuit, and also to enable the control circuit and release control over the output power after performing the initial test, the test circuit including a microcomputer.

12 Claims, 1 Drawing Sheet

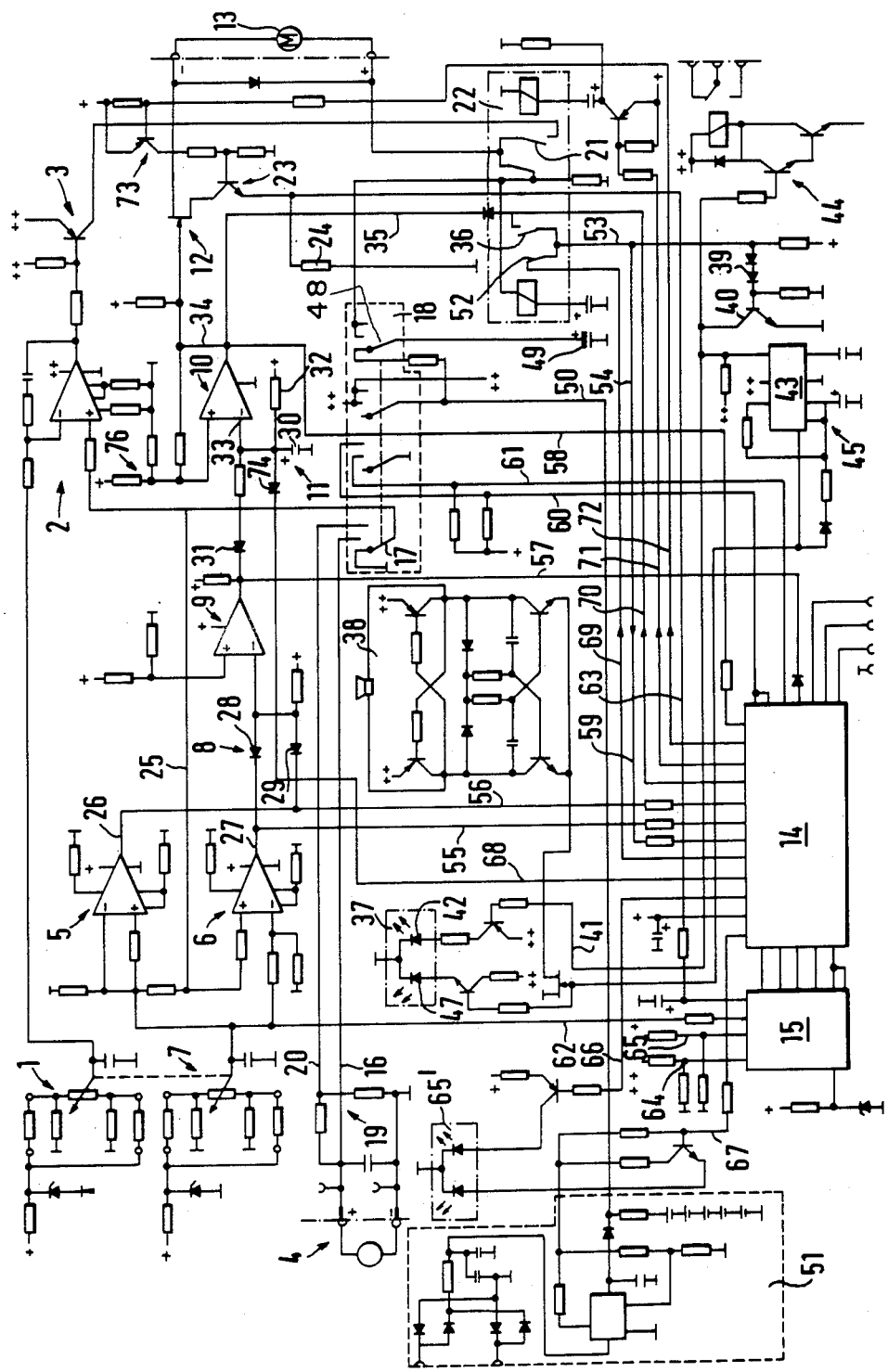

MONITORED CONTROL ARRANGEMENT

BACKGROUND OF THE INVENTION

The invention relates to a monitored control arrangement for an apparatus whose output power is monitored to avoid safety-endangering effects.

For a number of technical apparatuses the risk of a dangerous state is accepted under certain conditions, for example in machining and processing plant, flame monitoring systems, controls for lifting gear, remote action systems for gas and pipelines, radio remote controls for cranes according to ZH1/547 Richtlinien fur Funkfernsteuerung von Kranen and in particular electromedicinal apparatuses according VDE 0750/DIN IEC 601 Sicherheit elektromedizinischer Gerate, allgemeine Festlegungen—which corresponds to International Standard IEC 601-1,1 issued 1977. The measure of the extent of this risk is the number of faults which in combination can result in a dangerous state. For electromedicinal apparatuses the case of a first fault is the subject of particular requirements and tests, in particular the failure of a protection or monitoring system, as a result of which an immediate danger to the safety of a patient can arise.

For this reason electrical and mechanical provisions are made by which a fault endangering the functionability of one or more safety means and which cannot be excluded by mechanical provisions or assumed for elimination of the fault manifests itself in operation inhibition. If a single fault does not manifest itself and then results in a dangerous state in combination with a second independent fault, the operation inhibition must also take place.

For apparatuses of this safety class the electrical provisions against danger due to a first fault or against a first fault which has remained undetected in combination with a second independent fault can be implemented by a special apparatus structure:

It is known to make the output power of an apparatus whose undesired change, in particular by exceeding limit values, would result in danger, secure against single faults in accordance with the above definition in that said output power is maintained by a control or regulating circuit and said regulating or control circuit has associated therewith a monitoring system. When a undesired change of the output power occurs the monitoring system gives an alarm and at the same time returns the output power to a safe range or switches it off completely. An apparatus constructed in this manner is secure against a first fault in the regulating or control system because said fault is detected by the monitoring system. If however, a first fault occurs in the monitoring system and remains undetected in conjunction with a second fault in the control or regulating system it could result in a dangerous output power. Thus, for example with electromedicinal apparatuses of this structure the condition applies that the direct function of the monitoring or supervisory system must be checked automatically at least at the start of an operating phase. Thus, apart from the regulating or control system and the monitoring system another system must be provided for the initial automatic self-test.

It is known in apparatus structures of the aforementioned type to use microcomputers in that the functions either of the control system and/or the monitoring system are carried out completely or partially by a microcomputer. A disadvantage is that the failure direction of a microcomputer can in no way be predicted and consequently extensive conventional circuits are additionally necessary which continuously and/or initially check the correct mode of operation of the microcomputer. In addition, the discovery certainty of said conventional circuits is restricted. Increasing the chance of discovering faults when monitoring more complex relationships involves a considerable increase in the expenditure on conventional switching and circuit means.

Thus, with the aforementioned use of a microcomputer the safety risk is still relatively high in spite of the monitoring and also a high expenditure on circuitry and production costs in involved.

In the German Technical Journal "Der Elektroniker", no. 10, 1975, volume 14, page 6 to 9, problems of self-monitoring and the safety in drives with variable speed are generally discussed. In the speed-controlled drive explained in this publication a desired value/actual value comparison of the speed of rotation is continuously carried out. If the desired value differs beyond predetermined limits from the actual value an alarm is initiated. To avoid alarm initiations with brief load surges in front of the alarm output a time delay is provided which allows the alarm signal to appear at the output only when the alarm condition has obtained for a predetermined minimum duration.

However, a disadvantage with the drive known from this publication is that no tests are provided for the monitoring circuit before operation is started.

DE-OS No. 2,841,220 discloses a method of testing the function of a control system according to which a test device is connected between a control apparatus with self-monitoring circuit and the drive to be monitored. In the control system known therefrom for an antiskid or antiblocking system for motor vehicles after starting of the vehicle the antiblocking system is checked for any faults which may be present by a self-monitoring circuit integrated in the control apparatus in accordance with an internal test program. With an additionally connectable test device faults in the antiblocking circuit can be simulated so that it can be determined whether the self-monitoring of the antiblocking system is functioning satisfactorily. A disadvantage is that the self-monitoring circuit is obviously a complex circuit with which an internal test program is processed so that it is to be assumed that a microcomputer is used. It is very difficult with a conventional circuit to check a microcomputer-controlled circuit.

Furthermore, DE-OS No. 3,306,897 corresponding to U.S. Pat. No. 4,333,119 to Schoenmeyr discloses a monitored control arrangement for an engine with generator. This control arrangement comprises a control circuit, a monitoring circuit and a test circuit for an initial test for checking the monitoring circuit. However, the test circuit consists of a switch with which a fault condition can be triggered by hand. Consequently, more extensive and more complex testing of the monitoring circuit are not possible in the prior art known from this publication.

SUMMARY OF THE INVENTION

The problem underlying the invention is to provide a monitored control arrangement or regulating arrangement for an apparatus secure against single faults which with simple structure insures a high degree of reliability. It is also the problem of the invention to provide circuitry solutions for the aforementioned structure.

The problem underlying the invention is solved in a monitored control arrangement by providing a test circuit including a microcomputer means which is solely operative for performing an initial test upon the monitoring circuit to check for functionality of the monitoring circuit prior to operation of the monitoring circuit with a control circuit.

The actual control circuit and the monitoring circuit are of conventional construction of individual components, in particular individual semiconductors or operational amplifiers. The test circuit for the initial test of the monitoring circuit is on the other hand to consist of a microcomputer. In contrast to the known solutions the microcomputer or microprocessor does not here perform the control or regulating tasks or the monitoring tasks but fundamentally performs only the initial test of the correct function of the monitoring circuit. Only after the initial test with a faultless monitoring circuit is it possible to go over to the operating phase. During the operating phase the microcomputer performs either no functions or performs functions which have no safety significance or are of only secondary significance in that respect. As a rule, such an arrangement is preferable to the known solutions both from a technical point of view and from a commercial point of view because the control function of the output performance and its monitoring can usually be simply implemented with conventional means. The initial check of the correct function is however usually difficult and complicated to perform with conventional means.

In the arrangement according to the invention, in which the control circuit and the monitoring circuit are made with conventional circuit elements and switching means, the failure behaviour is predictable and detectable because the failure behaviour of the conventional individual circuit elements is known and verifiable. Thus, the verification of the correct function of the microcomputer in the system according to the invention can be dispensed with. Failure of a microcomputer means here an incorrect self-test because as regards safety and reliability the microcomputer only executes initial test functions. Failure of the microcomputer could only lead to dangerous output powers in conjunction with a second fault in the control system or monitoring system and a third fault in the monitoring system or control system. Thus, there is no component (microcomputer) having an unreliable component due to its unknown and unverifiable failure behaviour which is entrusted with safety or reliability functions, as would make higher demands on other monitoring circuit parts.

The monitored control arrangement thus consists of a two-channel system, the control circuit and the monitoring circuit, which is realized with individual semiconductors. A third system, consisting essentially of a microcomputer or microprocessor, is activated every time operation is started and automatically detects in an initial self-test the functionability of the monitoring circuit.

The protection objective is achieved as follows: First faults in the control circuit which could result in dangerous deviations of the output power are discovered during the operating phase by the monitoring circuit and lead to a limiting of the output power to a safe range or to disconnection of the apparatus by the monitoring circuit. First faults in the monitoring circuit are not discovered during operation but are detected on the next attempted startup by the test circuit and lead to a blocking of the operating phase. During the operating phase the microcomputer can perform further tasks which are however of no significance or only of secondary significance as regards safety.

In a preferred embodiment of the invention, the monitoring circuit and/or test circuit is to be connected to an acoustic and/or optical alarm means. As a result, in the event of a fault not only is the output power reduced to a safe value but the fault is also directly indicated to an operator.

As a result of the delay member exceeding of a limit value has no influence on the output power but on the other hand when a limit value is exceeded a reliable and continuous alarm results. This step, expedient in itself, is of course only possible with apparatuses where brief exceeding of a limit value does not have any dangerous effects.

The features of a specific embodiment of the invention of interrupting the connection of the controller output to the actuator or adjusting member during the test time have the effect that during the test any influence by the control circuit is excluded with certainty and as required only the monitoring circuit is in fact tested by the microcomputer.

In the initial test it is necessary as a rule to move the adjusting member or actuator through its entire range, for example to change the pump motor of an injection pump over its entire rotation speed range. Only by doing this can the monitoring circuit be reliably tested as regards response to limit values, etc. If in the example given the upper limit value of the monitoring circuit did not function the microcomputer would wait for its response. In this time although the microcomputer would certainly not enable the operating phase the pump motor would nevertheless work with its maximum speed. This would lead in the case of an already connected injection pump, for example for a dialysis patient, to dangerous conditions. An extremely safe circuit is one in which the energy supply during the test is from a charged capacitor. Since the usual power supply is disconnected during the test only the capacitor charge can be used up, after which the output power will certainly become zero. This circuit is advantageous in all possible monitored control arrangements and is thus of independent significance.

The disclosed control arrangement can be used particularly advantageously in a speed-controlled injection pump.

An apparatus comprising an injection or syringe pump with a speed-controlled electric motor having speed monitoring in connection with a monitored control arrangement according to the invention has proved itself in all its details and functions extremely useful.

With the aid of a drawing a example of embodiment of the invention will be explained more exactly, with further details, features and advantages.

BRIEF DESCRIPTION OF THE DRAWING

The sole FIGURE shows a circuit diagram for a monitored control arrangement of an injection pump.

DESCRIPTION OF SPECIFIC EMBODIMENTS

In the sole FIGURE a monitored control arrangement for an injection pump is shown as used in dialysis treatments. The control arrangement consists essentially of three units: As first unit a control circuit is provided which comprises a desired value generator 1, a regulating amplifier 2 with following power transistor 3 and a tachometer generator 4 as actual value pickup.

As second unit a monitoring circuit is provided which consists of two comparators 5, 6 which are connected to a further desired value generator 7 and to the tachogenerator 4 and which are followed by an OR member 8 and two further comparators 9, 10. Between the comparators 9, 10 a timing element 11 is disposed and the last comparator 10 controls an MOS switching transistor 12 which lies in the circuit of a motor 13.

As third unit a test circuit is provided for an initial test of the monitoring circuit and consists of a microcomputer 14 which cooperates with an analog-digital converter 15.

In particular the desired value generator 1 of the control circuit is a potentiometer with which from a voltage applied part is tapped as desired value reference for a comparator input of the regulating amplifier 2. The tachogenerator 4 can be connected via a line 16 and a switch contact 17 of an operating switch 18 to the second input of the regulating amplifier 2. The tachogenerator is followed by a resistor combination 19 which reduces the voltage of the tachogenerator to a tenth of the value and which is connectable via a line 20 in a next switching position of the switch contact 17 likewise to the second input of the regulating amplifier 2. The output value of the regulating amplifier 2 and thus the pump output can thus be increased by the factor 10. The transfer function of the servo or regulating amplifier 2 is proportional and integral and adapted to the time behaviour of the motor in such a manner that an adequate regulating speed is insured when the load changes as well as good follow-up behaviour on desired value variation almost without overshoot. In the operating mode the motor circuit is closed via the power transistor 3 following the regulating amplifier, a switch contact 21 (open in the drawing) of a release relay 22, the motor 13, the conductive switching transistor 12, a further following switching transistor 23 and a resistor 24.

In the normal operating case (the enable relay 22 is energized and the switch contact 21 closed) the control circuit has the following function: With the desired value generator 1 the desired pump delivery is set which is compared in the regulating amplifier 2 with the output of the tachogenerator 4, the actual value. As already stated, depending on the position of the switch arm 17 at the operating switch 18 a multiplication by the factor 10 is possible. In accordance with the comparison and the transfer function the regulating amplifier 2 furnishes its output value which is fed via the power transistor 3 directly as value of the motor current to the motor circuit.

The exact construction of the monitoring circuit and its function in the operating case will now be described, i.e. when the injection pump is already running after the initial test to be described later. The comparators 5, 6 are operational amplifiers 5, 6 connected as comparators. The comparators 5, 6 are limit switches for speed values of the motor 13 which can lead to a dangerous condition for the patient. The comparator 5 is a limit value generator for the exceeding of a predetermined high speed whilst the comparator 6 is a limit value generator for speeds below a low speed. The comparators 5, 6 thus form a "window" whose width s defined by the fixed resistances at the corresponding inputs. Said "window" must cover a certain non-critical range about the set control design value at the desired value generator 1, i.e. when the desired value is changed, for the control the position of the "window" must also be changed. This is done by the desired value generator 7 which is mechanically coupled to the desired value generator 1 in a double potentiometer. Thus, the predetermined comparison voltage for the comparators 5, 6 is varied along with and relatively to the control desired value variation. At the respective other input of the comparators 5, 6 via the line 25 the voltage value of the tachogenerator 4 is applied directly or after adjustment of the switching position of the switch contact 17 reduced by the factor 10. When the speed value applied via the line 25 drops below the fixedly preset values at the comparators 5 or 6 or exceeds said values, the output values thereof change. If the speed amount lies within the "window" the output voltages of the comparators 5, 6 are positive and on deviation out of said window are negative.

The comparator outputs 26, 27 are led together via two diodes 28, 29 in an OR circuit 8 and via the following comparator (operational amplifier) 9 are invertingly compared with half the positive voltage. When a speed deviation outside the "window" occurs the output of the comparator 9 becomes positive and a capacitor 30 of the timing member 11 whose charging is otherwise prevented by a diode 31 is charged via a resistor 32.

This means that on a deviation of the speed outside the permissible tolerance the voltage rises only slowly corresponding to the charging of the capacitor 30 at the input 33 of the comparator 10. In this comparator (operational amplifier) 10 the capacitor voltage is now likewise invertingly compared with a part of the positive voltage. If the voltage of the capacitor 30 exceeds said threshold voltage the comparator 10 switches with its output to ground and renders the following MOS transistor 12 non-conductive. Since said transistor is in the motor circuit the latter is interrupted when the speed deviates beyond the tolerance defined by the comparators 5, 6 and thus stops the pump delivery. The excess or deficient speed situation is thus passed on with delay to the disconnection transistor 12, the delay time being defined substantially by the dimensions of the capacitor 30 and of the resistor 32 and by the threshold of the comparator 10 set with the resistance ratio 76. On a change from an inadmissible excessive or inadequate speed range to the permissible "window range" the capacitor is also discharged with delay. As a result, brief speed deviations, which in themselves are inadmissible but which do not cause any dangerous conditions for the patient are suppressed. However, at the same time it is also insured that in the case of disconnection and the alarm generation explained below the detected alarm condition leads to a stable alarm production.

To the line 34 leading from the output of the comparator 10 to the disconnection transistor 12 a further line 35 is connected which is connected via a switch arm 36 (which is closed in the normal operating condition) to an alarm means. The alarm means consists substantially of an optical display unit 37 and an acoustic alarm generator 38. The line 35 leads via diodes 39 to the base of a transistor 40. In trouble-free operation the transistor 40 is conductive and thus drives the green-lit part of the optical display 37 (LED) via the line 41. This display means trouble-free operation with control deviations of the speed within the admissible window magnitude. In the case of greater deviations via the line 35 the transistor 40 is rendered non conductive with the disconnection transistor 12. As a result, the green LED 42 is disconnected, a timer activated and at the same time a nurse call relay 44 driven with the potential-free contacts of which a remote alarm can be produced. When the timer 43 is enabled it operates as astable multivibrator. The frequency and the duty cycle are defined by an RC member 45. The output of the timer is for about 3 seconds at almost ground potential and for about 0.6 seconds at almost battery potential and thus switches a red-lit LED 47 in the optical display 37 and parallel thereto the alarm acoustic generator 38 via an MOS transistor.

The acoustic alarm generator 38 is a minature loudspeaker which energizes a collector-coupled freely oscillating astable multivibrator with connected collector resistors in a power bridge. The frequency is set to about 2 KHz. The circuit starts operating with certainty, in contrast to conventional collector-coupled multivibrators.

To reduce the power loss the supply voltage of the alarm circuit is not stabilized.

After this description of the normal operating case with normally operating control within the admissible window when the speed deviation is inadmissibly great, with disconnection and alarm, to facilitate understanding the structure and function of the test circuit for the function testing of the monitoring circuit will be explained. This function test is automatically executed prior to each operating phase.

An essential feature during the test phase resides in that the enable relay 22 is not excited and the control variable is separated from the motor current by the open contact 21. When the operating switch 18 is switched on via its last switch arm 48 a capacitor 49 is connected into the motor circuit. In the switched-off condition of the operating switch said capacitor 49 is connected via the line 50 permanently to the battery-buffered supply voltage 51 which is applied continuously to the mains and therefore charged before every operating phase. By the disconnection of the control any influencing of the motor circuit in the test phase by the motor servo is excluded and at the same time during the test phase only the limited charge of the capacitor 49 is available as test energy. The motor can thus rotate in the test phase only until the charge of the capacitor has been used up.

In the test position of the enable relay 22 (illustrated condition) a further switch contact 52 connects the control line 53 of the alarm circuit to the microcomputer 14. (During the operating phase the control line 53 is connected via the switch contact 36 to the line 35 and the output of the monitoring circuit.) As a result, in the test position an alarm can be caused only by the microcomputer 14. In a proper test run the operator can observe two test alarms (inadequate speed and excess speed) which indicate the proper function of the monitoring circuit. Thereafter, in a proper test run the release relay is energized by the microcomputer 14 and the switch contacts 21 and 36 are closed. As a result the motor circuit is connected via the regulating transistor 3 to an unstabilized supply voltage and at the same time the control line 53 to the monitoring circuit line 35. The control line 53 has however contact with the microcomputer 14 via a line 54 so that in the operating phase an alarm can be activated both via the speed monitoring circuit and by the microcomputer 14.

The microcomputer thus receives directly digital information via the following lines:

via lines 55, 56 the position of the outputs of the comparators 5 and 6 for determination of the speed limit values, via the line 57 the output position of the comparator 9 after the OR member 8, via the line 58 the output position of the last comparator 10 from the speed monitoring circuit or the gate voltage of the disconnection transistor 12, the potential of the drive line 53 for the alarm circuit via the line 59, via the lines 60, 61 the position of the operating switch 18, whether the normal range or the range times the factor 10 is set.

The microcomputer 14 receives the following (continuous) information via the analog-digital converter 15:

via the line 62 the desired value voltage for the speed monitoring circuit, via the line 63 the magnitude of the motor current, via the line 64 the battery voltage and via the line 65 the output voltage of the 5 V fixed voltage regulator.

Associated with the microcomputer 14 is the analog-digital converter 15 as an 8-bit analog-bit digital converter with 4 unipolar inputs. The reference voltage of the converter is obtained via a band gap reference diode. The signal communications between the microcomputer 14 and the analog-digital converter 15 are in time multiplex.

The microcomputer 14 can perform the following functions:

activate the red-lit part of an LED display 65' for excess current indication via the line 66, disconnect the green-lit part of the LED display 65' (mains ON) via the line 67, discharge the capacitor 30 of the timing member 11 via the line 68, initiate an acoustic and optical alarm; in the test phase via the line 69 and in the operating case via the line 70, excite the enable relay 22 via the line 71, switch the motor 13 currentless via the line 72, a transistor 73 and the following transistor 23.

On each startup the automatic self-test proceeds essentially as follows:

The capacitor 49 is connected in the OFF position of the operating switch 18 to the battery. When the operating switch 18 is switched on with part of the capacitor charge of the capacitor 49 the enable relay 22 is brought into the position test (shown) and the remaining charge made available for runup of the motor 13 during the test phase. With the switching on the transistor 23 is currentless, i.e. the motor is stationary. A fixed voltage regulator generates the reset signal for the computer (active low), the computer ports thereby being switched as input and having a potential corresponding to the supply voltage. The transistor 23 remains nonconductive. After at least 50 msec the microcomputer 14 starts the program.

At the program start there is the enable to the interrupt, which is initiated during the test phase whenever the operating switch 18 is brought into the position "times 10". The so called interrupt service routine initiates computer alarm. The self-test is thus possible only in the position "times 1" of the operating switch 18. Rotating the operating switch 18 during the test phase thus leads to alarm generation. Thus, for a proper test run the user must bring the operating switch 18 to the position "times 1" and can then observe the proper test run, indicated by double alarm generation with possible subsequent enable.

There then follow the activation of the alarms (69) and the checking of the battery voltage (line 64), the 5 V fixed voltage and the desired value for the speed monitoring (line 62), and the confirmation of the currentless condition of the motor (63) and the checking of the starting position of all comparators of the speed monitoring (lines 55, 56, 57, 58). All starting positions must correspond to the actual state "motor 13 stationary; insufficient speed".

By a runup of the motor 13 caused by the microcomputer 14 the function of the limit value comparators 5, 6 is now checked. The microcomputer 14 must intervene in the monitoring circuit in such a manner than the disconnection transistor 12 is switched on. For this purpose via a diode 74 and the line 68 the capacitor 30 is discharged. The transistor 23 switchable by the microcomputer 14 is now rendered conductive, the motor circuit to the capacitor 49 thus being closed. The motor thus runs with increasingly rising speed. Via the voltage drop at the resistor 24 and at the analog-digital converter 15 the motor current flow is checked by the microcomputer 14. With increasing speed the threshold values of the comparators 5, 6 are passed and via the lines 55, 56 the change of their output positions checked and via the line 57 the change of the output position of the comparator 9. The output position of the last comparator 10 is not checked because due to the limited test energy available from the capacitor 49 the delay due to the timing member 11 in front of the comparator 10 cannot be waited for. The change of the output situations of the three comparators 5, 6, 9 when the motor is running up must correspond to the cycle (inadequate speed—speed corresponding to the reference value—excess speed). After this check with coarse measurement of the window width the motor is again rendered currentless, always with subsequent testing.

In a further step the prevention of the charging of the capacitor 30 via the diode 74 is removed. The running time is now measured via the RC member at the capacitor 30 and via the last comparator 10 by the microcomputer 14: The output position of the comparator 9 must be the alarm situation and consequently the capacitor 30 must be charged and on reaching the threshold voltage must change the output position of the last comparator stage 10 to the alarm position. The time difference between this instant and the instant of the enabling of the charging by the microcomputer 14 is the total running time of this stage and is stored in the computer.

The RC member 30 is now again discharged by the microcomputer 14 and released for renewed charging to test the disconnection functioning of the disconnecting transistor 12. When the motor is currentless the output position of the comparator 19 is always the alarm situation. The capacitor 30 must therefore be charged with the time constant now known to the computer and when the threshold voltage is reached the disconnecting transistor 12 must be rendered non-conductive. Shortly prior to this instant the computer again switches the motor on and with the remaining charge in the capacitor 49 said motor can rotate further to check the disconnection of the motor by the disconnecting transistor 12. This is carried out via the line 63—motor current present/currentless. The almost complete discharge of the capacitor 49 is now waited for. With conclusion of this last test gap the computer alarm is disconnected and the enable relay 22 brought to its operating position. To allow the delivery range "times 10" the interrupt input is inactivated by the program.

During the prescribed test alarms in the present circuit the nurse call relay is energized each time. It would however be readily possible to suppress the resulting remote alarm during the test phase by disconnecting the lead to the nurse call relay 44.

After enabling by the microcomputer 14 the latter again checks the control line 53 for the alarm circuit for correct potential. This last test step initiates the continuous check of the motor current, battery voltage, 5 V fixed voltage, desired value and position of the operating switch 18. In the present case the microcomputer 14 thus also performs monitoring functions during the operating phase. However, the variables monitored by the microcomputer 14 cannot lead directly to any danger for a patient connected to the injection pump because for the latter only an undesired pump delivery and thus speed can produce a dangerous effect. This speed is however monitored for critical limit values independently of the microcomputer by the speed monitoring circuit. The microcomputer 14 is thus used in the sense of the remarks made at the beginning for additional functions not relevant to safety.

A direct current motor is used with which of course there is an almost linear relationship between the motor current and the torque delivered. With the present injection pump, however, the forwards speed is extremely slow so that the piston of the injection pump, in particular when using plastic syringes, is moved forwards almost continuously by stepwise interchange between static and sliding friction. The load on the motor changes continuously correspondingly, the load for overcoming the static friction being greater then during a sliding friction condition. The motor current continuously follows these changing load conditions and thus continuously changes its absolute value. The short-time behaviour of the current is greatly influenced by the advancing speed set. As a rule, the magnitude of the current peaks for overcoming static friction conditions increases with decreasing forwards speed.

A convenient measure for the motor current is thus a motor current mean value. To determine this with adequate accuracy the motor current must be integrated and the respective forwards speed incorporated into the integration algorithm. It is exceedingly difficult to realize a suitable integrator with conventional circuit means. In the present embodiment the microcomputer thus performs this function, not relative to the safety, of motor current integration taking account of the delivery rates set. The delivery rates set are in any case reported to the microcomputer by the position of the desired value potentiometer 7 and of the selection switch 18. The microcomputer calculates a motor current mean and compares the latter with fixedly programmed or externally set reference values for a minimum and maximum current. On deviations therefrom a current alarm is generated which is shown to the operator as pressure alarm.

It has been found advantageous and expedient to measure the mechanical friction of the apparatus without syringe and feed it in together with the motor characteristic as device-specific apparatus characteristic which as a rule can then no longer be varied. In addition, in the integration account is taken of the delivery rate which is known to the microprocessor in any case, as explained above. By variation of the resistance 24 the position of the motor current instantaneous characteristic can be adapted to the reference values in the memory.

The change of the delivery power by changing the operating switch 18—times 1; times 10—is indicated to the user by the microcomputer 14 in both directions by two optical and acoustic alarms. Via a Shottky diode the gate of the MOS disconnecting transistor is decoupled so that during the switchover the motor does not become stationary.

In operation a computer alarm is indicated by activation of the control line for the alarm unit (line 70) and an alarm due to excess current additionally by switching to the red LED in the optical display 65′ (lines 66, 67).

What is claimed is:

1. In an apparatus whose output power is monitored and controlled to avoid safety-endangering effects, a monitored control arrangement comprising:
   a control circuit for controlling said output power at a desired level, said control circuit including circuit elements with known failure rates;
   a monitoring circuit electrically connected to said control circuit for monitoring said output power and, if said output power exceeds a critical level, disconnecting said control circuit to limit said output power as controlled by said control circuit, said monitoring circuit including conventional circuit elements, said conventional circuit elements having known failure behavior; and
   a test circuit means electrical connected to said monitoring circuit and to said control circuit for disabling said control circuit and controlling said output power while performing an initial test on said monitoring circuit and for enabling said control circuit and releasing control over said output power only after performing said initial test, said test circuit including a microcomputer.

2. Monitored control arrangement according to claim 1 utilizing a continuous power supply wherein a capacitor (49) is connected in substitution for said continuous power supply (51) for supplying power at the start of the initial test and only after a positive test indication is said continuous power supply (51) connected by the microcomputer (14).

3. Monitored control arrangement according to claim 1 wherein the apparatus includes an injection-type pump utilizing a speed-controlled electric motor (13) and a speed monitoring means.

4. Monitored control arrangement according to claim 1 wherein the monitoring circuit and the test circuit are connected to a visual alarm generating means (37, 38).

5. Monitored control arrangement according to claim 1 wherein the monitoring circuit and the test circuit are connected to an acoustic and visual alarm generating means (37, 38).

6. Monitored control arrangement according to claim 1 wherein the control circuit comprises:
   a potentiometer (1) as said first desired value generator and a first operational amplifier (2) which is connected as a first comparator having comparator inputs, wherein said comparator inputs are connected to the first desired value generator (1) and a tachogenerator (4), the output of which is connected to a base electrode of a power transistor (3) in the monitoring circuit;
   wherein the monitoring circuit comprises:
   second and third operational amplifiers connected as second and third comparators (5, 6) for an upper and lower limit value (window), a plurality of inputs to the second and third comparators being connected to a second desired value generator (7) which is coupled to the first desired value generator (1) for corresponding displacement of the window, and further inputs to the second and third comparators being connected to the tachogenerator (4),
   wherein a plurality of outputs (26, 27) from the second and third comparators are compared in an OR circuit (8) whose output, when a limit value is exceeded, charges a capacitor (30) as a timing member of a time delay means (11), the charge condition being compared in a fourth operational amplifier connected as a fourth comparator (10) with a fixed reference voltage,
   wherein a signal input of said fourth comparator (10), on exceeding a predetermined charge voltage, switches the output of the fourth comparator (10) which is connected to a switching transistor (12) in the motor circuit and to the alarm generating means; and
   wherein the microcomputer (14) of the test circuit is connected via an analog-digital converter (15) to the second desired value generator (7) and directly to outputs of the second, third and fourth comparators (5, 6, 10), to the capacitor (30), and to a switching transistor (73, 23) for interrupting the motor circuit and enabling a relay (22) and an alarm means (37, 38).

7. Monitored control arrangement according to claim 6 utilizing a continuous power supply wherein a capacitor (49) is connected in substitution for said continuous power supply (51) for supply power at the start of the initial test and only after a positive test indication is said continuous power supply (51) connected by the microcomputer (14).

8. Monitored control arrangement according to claim 1, wherein the monitoring circuit and the test circuit are connected to an acoustic alarm generating means (37, 38).

9. Monitored control arrangement according to claim 1, wherein the monitoring circuit includes a time delay member (11) so that overrun of the critical level for less than a certain duration has no influence on the output power or an alarm generation but whenever a limit value is exceeded for a certain duration then an alarm generation takes place.

10. Monitored control arrangement according to claims 1, 8, or 9, wherein during said initial test the control circuit is disabled by means of a switch arm (21), and, after completion of said initial test and positive checking of the monitoring circuit, the switch arm (21) is closed by the microcomputer (14).

11. Monitored control arrangement according to claim 10 utilizing a continuous power supply, wherein, a capacitor (49) is connected in substitution for said continuous power supply (51) for supplying power at the start of the initial test and only after a positive test indication is said continuous power supply (51) connected by the microcomputer (14).

12. Monitored control arrangement according to claim 11, wherein the apparatus includes an injection-type pump utilizing a speed-controlled electric motor (13) and a speed monitoring means.

* * * * *